United States Patent
Eichhorn et al.

(10) Patent No.: US 12,085,009 B2
(45) Date of Patent: Sep. 10, 2024

(54) INTERNAL COMBUSTION ENGINE WITH SPARK PLUG AND PRECHAMBER SPARK PLUG

(71) Applicant: Robert Bosch GmbH, Stuttgart (DE)

(72) Inventors: Alexander Eichhorn, Freiberg (DE); Alexander Hettinger, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/546,533

(22) PCT Filed: Feb. 9, 2022

(86) PCT No.: PCT/EP2022/053098
§ 371 (c)(1),
(2) Date: Aug. 15, 2023

(87) PCT Pub. No.: WO2022/179849
PCT Pub. Date: Sep. 1, 2022

(65) Prior Publication Data
US 2024/0133337 A1  Apr. 25, 2024
US 2024/0229705 A9  Jul. 11, 2024

(30) Foreign Application Priority Data
Feb. 26, 2021  (DE) .................... 10 2021 104 628.9

(51) Int. Cl.
F02B 19/12   (2006.01)
F02B 1/04    (2006.01)
F02B 17/00   (2006.01)

(52) U.S. Cl.
CPC .............. *F02B 19/12* (2013.01); *F02B 1/04* (2013.01); *F02B 17/005* (2013.01)

(58) Field of Classification Search
CPC .......... F02B 19/12; F02B 1/04; F02B 17/005
USPC ....................................................... 123/260
See application file for complete search history.

(56) References Cited

U.S. PATENT DOCUMENTS

| | | | |
|---|---|---|---|
| 2014/0209057 A1* | 7/2014 | Pouring | F02B 19/1009 123/257 |
| 2019/0078498 A1* | 3/2019 | Bedogni | F02B 19/1019 |
| 2020/0309083 A1 | 10/2020 | O'Connor et al. | |
| 2021/0222643 A1* | 7/2021 | Nagatsu | F02D 41/1475 |

FOREIGN PATENT DOCUMENTS

| | | | |
|---|---|---|---|
| AT | 522438 A4 | | 11/2020 |
| AT | 522462 A4 | | 11/2020 |
| CN | 106762127 A | * | 5/2017 |

(Continued)

OTHER PUBLICATIONS

International Search Report corresponding to PCT Application No. PCT/EP2022/053098, mailed May 27, 2022 (German and English language document) (5 pages).

*Primary Examiner* — Mahmoud Gimie
(74) *Attorney, Agent, or Firm* — Maginot, Moore & Beck LLP

(57) ABSTRACT

The present disclosure relates to an internal combustion engine, comprising: at least one cylinder; two charge-exchange ports per cylinder, a first charge-exchange port being an inlet port, and a second charge-exchange port being an outlet port; and one spark plug and one prechamber spark plug per each cylinder.

19 Claims, 8 Drawing Sheets

(56) References Cited

FOREIGN PATENT DOCUMENTS

| | | |
|---|---|---|
| DE | 10 2017 125 946 A1 | 5/2018 |
| DE | 10 2018 112 450 A1 | 11/2019 |
| DE | 10 2019 205 478 A1 | 10/2020 |
| DE | 102020110960 A1 * | 10/2020 |
| EP | 3 453 856 A1 | 3/2019 |
| EP | 3 561 255 A1 | 10/2019 |

* cited by examiner (a)

(b)

(c)

(a)

(b)

(c)

(d)

(a)

(b)

(c)

(d)

INTERNAL COMBUSTION ENGINE WITH SPARK PLUG AND PRECHAMBER SPARK PLUG

This application is a 35 U.S.C. § 371 National Stage Application of PCT/EP2022/053098, filed on Feb. 9, 2022, which claims the benefit of priority to Serial No. DE 10 2021 104 628.9, filed on Feb. 26, 2021 in Germany, the disclosures of which are incorporated herein by reference in their entirety.

BACKGROUND

The present disclosure relates to an internal combustion engine with a spark plug and a prechamber spark plug and a method for operating an internal combustion engine.

Internal combustion engines with prechamber spark plugs are known from the prior art. Prechamber spark plugs comprise, as is known for conventional spark plugs, a center electrode arranged in a housing and a earth electrode, which define between them an ignition gap in which an air-fuel mixture is ignited. This ignited air-fuel mixture is subsequently fed through ports in a plug cap located at the combustion chamber end of the prechamber spark plug into a combustion chamber of the internal combustion engine, in which the actual combustion of an air-fuel mixture for the piston stroke takes place. For example, DE 10 2019 205 478 A1 discloses such a prechamber spark plug.

SUMMARY

The internal combustion engine according to the disclosure having the features disclosed herein is characterized by an improved mode of operation which enables a particularly high efficiency with a low knock tendency and a reliable operation in any operating conditions. According to the disclosure, this is achieved by an internal combustion engine which comprises at least one cylinder and which comprises one spark plug and one prechamber spark plug per cylinder. The internal combustion engine further comprises two charge-exchange ports per cylinder. A first charge-exchange port is an inlet port and a second charge-exchange port is an outlet port.

A "spark plug" in this context is an ordinary spark plug, in particular with exposed electrodes, which is configured to ignite a fuel-air mixture by means of an electrical spark between at least two electrodes. Particularly preferably, the spark plug comprises a straight center electrode and at least one hook-shaped front or roof electrode. In particular, such a spark plug can alternatively be referred to as a "spark plug". Alternatively, a laser device could be used as a "spark plug", which is configured to ignite the fuel-air mixture by means of laser radiation.

A "prechamber spark plug" is a design with a prechamber formed within a plug cap, which is in fluid communication with a combustion chamber of the internal combustion engine via passage ports in the plug cap. Doing so enables gases to pass from the prechamber through the plug cap into the combustion chamber and vice versa. Preferably, the plug cap is arranged at a combustion chamber-side end of a housing of the prechamber spark plug as viewed in the axial direction of the prechamber spark plug. The plug cap, housing, and prechamber form integral components of the prechamber spark plug. In particular, the prechamber is thus located inside the prechamber spark plug. Inside the prechamber, electrodes are used to ignite a fuel-air mixture in the prechamber, whereby flare jets pass through the passage ports in the plug cap and ignite the fuel-air mixture in the combustion chamber. In other words, the actual ignition of the fuel-air mixture in the combustion chamber takes place by means of the flare jets generated by the prechamber spark plug. Preferably, the prechamber spark plug is in this context regarded as an integral component which can be mounted in a cylinder head of the internal combustion engine. Preferably, the fastening is performed such that, in an end position, the through passage ports in the plug cap are aligned in a predefined manner, in particular in order to generate specifically aligned flare jets during operation. For example, the prechamber spark plug can be designed to be screwed into a standard thread of the cylinder head that can accommodate an ordinary spark plug.

The combination of ordinary spark plug and prechamber spark plug offers the advantage of a particularly flexible, efficient and reliable operation of the internal combustion engine. As a result, optimum and reliable ignition of the fuel-air mixture in the combustion chamber can always take place in any operating state, such as cold start, catalytic converter heating phase, partial load, full load, and the like. Preferably, an operation of the internal combustion engine can be designed to use the prechamber spark plug as the sole ignition option in the widest possible operating range to achieve effective knock reduction and low fuel consumption, particularly at high load. The spark plug can be operated additionally or alone in operating ranges in which operation of the prechamber spark plug is disadvantageous or impossible, for example during a cold start, in order to achieve reliable ignition in these ranges as well. Doing so results in the further advantage that the prechamber spark plug can be specifically optimized for the most efficient operation possible, for example for certain operating points of the internal combustion engine, in which case a decrease in efficiency at other operating points can be disregarded or accepted, since at these operating points, for example, the spark plug can be used alone or additionally for ignition. In addition, the ignition, which can always be optimally adjusted for a wide range of operating ranges, can prevent damage to the internal combustion engine, for example due to knocking, misfiring or poor combustion, thus enabling a particularly long service life of the internal combustion engine.

The disclosure discloses preferential embodiments of the disclosure.

Preferably, the spark plug and/or the prechamber spark plug is arranged on a combustion chamber roof of a combustion chamber of the cylinder. In particular, the combustion chamber roof forms an upper end of the combustion chamber along a stroke direction of a piston. Preferably, the combustion chamber roof is part of a cylinder head of the internal combustion engine. Preferably, the prechamber spark plug and the spark plug protrude into the combustion chamber. Preferably, a plug cap of the prechamber spark plug and electrodes of the spark plug protrude into the combustion chamber. Alternatively, combustion chamber-side ends of the prechamber spark plug and the spark plug can also be arranged within a respective plug bore in which the corresponding prechamber spark plug or spark plug is arranged.

Particularly preferably, the charge exchange ports are arranged in the combustion chamber roof. The combustion chamber roof is divided into two roof areas by a first sectional plane, in which case the sectional plane is arranged on the center points of the two charge-exchange ports and is in particular parallel to a piston direction of a piston. The spark plug and the prechamber spark plug are in this case arranged within the same roof area. In this way, mixture formation in the combustion chamber can be adapted in a particularly targeted manner locally to that roof area in which the spark plug and the prechamber spark plug are located in order to obtain optimum ignition. Alternatively, the spark plug and the prechamber spark plug are arranged within different roof areas. This means that the free space on the roof area can be used to particular advantage, for example for other components such as injectors.

Preferably, the combustion chamber roof is divided by a second sectional plane perpendicular to the first sectional plane, the second sectional plane being arranged such that the inlet port and the outlet port are located on different sides of the second sectional plane. Particularly preferably, the second sectional plane is perpendicular to a connecting line of the center points of the two charge-exchange ports, and preferably between a respective outer edge of the charge-exchange ports. The spark plug and/or the prechamber spark plug are thereby arranged, in particular substantially, on the second sectional plane. Such a position enables the spark plug and/or the prechamber spark plug to be arranged particularly close to a center point of the combustion chamber roof, which has an advantageous effect on optimum ignition and uniform ignition in the combustion chamber.

Particularly preferably, the prechamber spark plug is arranged closer to the inlet port than the spark plug in order to enable a particularly good and direct supply of fresh air, especially to the prechamber of the prechamber spark plug. Alternatively, the prechamber spark plug is arranged closer to the outlet port than the spark plug, so that, in other words, the spark plug is arranged closer to the inlet port than the prechamber spark plug. In this case, a particularly effective supply of fresh air to the spark plug can be achieved in order to obtain optimum ignition during its operation.

Preferably, the prechamber spark plug is arranged closer to a sidewall of the cylinder than the spark plug. In particular, the prechamber spark plug is arranged laterally on the combustion chamber roof. Doing so enables more space to be provided for the spark plug and, e.g., other components in the area of the center of the combustion chamber. Preferably, the prechamber spark plug in this case is designed so that flare jets generated by means of the prechamber spark plug during ignition are aligned in the direction of a combustion chamber center. Alternatively, the spark plug is arranged closer to the sidewall of the cylinder than the prechamber spark plug. In this case, more space is provided for the prechamber spark plug in the area of the combustion chamber roof center to enable high efficiency of operation of the prechamber spark plug. In this context, a sidewall is considered to be an essentially cylindrical lateral surface of the cylinder, which can also be referred to as the running surface of the piston.

Further preferably, the prechamber spark plug is arranged closer to a center point of the combustion chamber roof than the spark plug. This makes it easy to achieve particularly uniform penetration of the combustion chamber by means of the generated flare jets for uniform ignition of the fuel-air mixture. Alternatively, the spark plug is preferably arranged closer to the center point of the combustion chamber roof than the prechamber spark plug in order to achieve particularly effective and uniform ignition during operation of the spark plug.

Preferably, the spark plug and/or the prechamber spark plug is arranged within a center point area of the combustion chamber roof. The center point area is defined as a circular area with a predefined radius around a center point of the combustion chamber roof. The predefined radius is preferably no more than 50% of a cylinder radius. Particularly preferably, the spark plug and/or the prechamber spark plug is arranged as close as possible to the center point of the combustion chamber roof depending on a position of the charge-exchange ports, whereby the most homogeneous ignition possible can be achieved, starting from a central area of the combustion chamber.

Preferably, the internal combustion engine further comprises a combustion chamber fuel injector which is arranged to inject fuel, in particular liquid or gaseous fuel, directly into the combustion chamber of the internal combustion engine.

Preferably, the combustion chamber fuel injector is arranged on the combustion chamber roof of the combustion chamber of the cylinder. In particular, the combustion chamber fuel injector is thus located in the vicinity of the prechamber spark plug and/or the spark plug in order to generate a uniform fuel-air mixture optimally adapted to the position of the prechamber spark plug and/or spark plug for uniform ignition.

The charge-exchange ports are preferably arranged in the combustion chamber roof, in which case the combustion chamber roof is divided into two roof areas by a first sectional plane such that the first sectional plane lies on respective center points of the two charge-exchange ports, and the combustion chamber fuel injector and the spark plug being arranged within the same roof area. Doing so can enable a close proximity between the combustion chamber fuel injector and the spark plug to provide high efficiency in spark plug operation. Alternatively or additionally, the combustion chamber fuel injector and the prechamber spark plug are arranged within the same roof area. In this case, the prechamber spark plug and the combustion chamber fuel injector can be arranged particularly close to each other on the combustion chamber roof in order to achieve a particularly high efficiency during operation of the prechamber spark plug.

Particularly preferably, the combustion chamber roof is divided by a second sectional plane perpendicular to the first sectional plane such that the inlet port and the outlet port are each located on one side of the second sectional plane. Preferably, the second sectional plane is arranged tangentially with respect to each of the two charge-exchange ports. The combustion chamber fuel injector is arranged on the second sectional plane. Doing so enables the combustion chamber fuel injector to be arranged particularly close to the center point of the combustion chamber roof to enable the most even fuel distribution possible in the combustion chamber and thus uniform and efficient combustion.

Preferably, the combustion chamber fuel injector is arranged within a center point area with a predefined maximum radius around a center point of the combustion chamber roof. Particularly preferably, the maximum radius of the center point area is 50% of the cylinder radius. By arranging the combustion chamber fuel injector as centrally as possible, uniform fuel distribution in the combustion chamber and even and efficient combustion can be achieved.

Preferably, a distance between the combustion chamber fuel injector and the sidewall of the cylinder is at most 30%, particularly preferably at most 15%, of the cylinder radius. In other words, the combustion chamber fuel injector is arranged close to the sidewall, i.e. it is not located centrally but laterally on the combustion chamber roof. Preferably, in this case, the combustion chamber fuel injector is oriented at an angle so that an injection direction of the fuel to be injected is oriented towards the center of the combustion chamber. The lateral arrangement of the combustion chamber fuel injector enables a particularly space-saving arrangement on the combustion chamber roof, whereby more space is provided for the arrangement of the spark plug and/or the prechamber spark plug, in particular in the central area of the combustion chamber roof.

Particularly preferably, the prechamber spark plug is arranged closer to the combustion chamber fuel injector than the spark plug. Such an arrangement of combustion chamber fuel injector and prechamber spark plug close to each other has a particularly beneficial effect on efficient and reliable operation of the prechamber spark plug. The proximity between the combustion chamber fuel injector and the prechamber spark plug result in improved scavenging and mixture supply to the prechamber spark plug.

Alternatively, the spark plug is preferably arranged closer to the combustion chamber fuel injector than the prechamber spark plug. In this case, a particularly good mixture supply can be provided in the area of the spark plug. Such an arrangement of combustion chamber fuel injector and spark plug close to each other enables, e.g., a particularly robust operation of the internal combustion engine during a catalyst heating.

Preferably, the combustion chamber fuel injector and the prechamber spark plug are arranged at a distance of no more than 50%, in particular no more than 30%, preferably no more than 10%, of a cylinder radius of the cylinder.

Further preferably, the combustion chamber fuel injector and the spark plug are arranged at a distance of at most 50%, in particular at most 30%, preferably at most 10%, of the cylinder radius of the cylinder.

Particularly preferably, an injection direction, i.e., a direction along which the fuel is essentially injected, of the combustion chamber fuel injector is aligned in the direction of the prechamber spark plug, in particular aligned with a plug cap of the prechamber spark plug. Doing so makes it possible to achieve particularly good scavenging and mixture supply to the prechamber of the prechamber spark plug. Alternatively, preferably, the direction of injection is substantially in the direction of the spark plug.

Preferably, the internal combustion engine further comprises an intake manifold fuel injector arranged to inject fuel into an intake manifold of the internal combustion engine. In particular, the intake manifold opens into the combustion chamber by means of the inlet port. The intake manifold fuel injector is advantageously provided as an alternative to a direct injection combustion chamber fuel injector arranged on the combustion chamber. As a result, there is a particularly large amount of space provided on the combustion chamber roof, and especially in the cylinder head, for the spark plug and the prechamber spark plug to be optimally arranged and aligned in each case.

Furthermore, the disclosure relates to a method for operating an internal combustion engine which comprises at least one cylinder and two charge-exchange ports per cylinder, a spark plug and a prechamber spark plug. The spark plug and/or the prechamber spark plug is operated to ignite a fuel-air mixture within the combustion chamber of the cylinder. In other words, during operation of the internal combustion engine, there can be simultaneous operation of the prechamber spark plug and the spark plug, or alternatively operation of the spark plug or the prechamber spark plug alone to ignite the fuel-air mixture in the combustion chamber. Doing so enables a particularly flexible and efficient operation of the internal combustion engine.

Preferably, the prechamber spark plug is operated alone during operation of the internal combustion engine under high load, in particular while the spark plug is inactive. Preferably, high load is considered to be operation at a torque of at least 20%, preferably at least 50%, more preferably at least 80%, of a nominal torque of the internal combustion engine. Preferably, this torque threshold can be dependent on a rotational speed of the internal combustion engine, or further key figures, such as a lambda number, control times of valves, an engine temperature, or the like. By operating the prechamber spark plug alone at high load, a particularly efficient operation as well as an effective reduction of the knock tendency of the internal combustion engine can be achieved.

Further preferably, the spark plug is operated alone during operation of the internal combustion engine under low load, in particular while the prechamber spark plug is inactive. Preferably, low load is considered to be operation at a torque of less than 80%, preferably less than 50%, more preferably less than 20%, of a rated torque of the internal combustion engine. Doing so enables reliable ignition by means of the spark plug even at low loads.

Particularly preferably, the spark plug is operated during a catalyst heating phase, in particular after a cold start of the internal combustion engine. Preferably, the spark plug is operated alone during the catalyst heating phase, in particular while the prechamber spark plug is inactive. Optimum ignition of the fuel-air mixture can thereby be reliably ensured by means of the spark plug after the cold start, where, for example, optimum conditions for the operation of the prechamber spark plug are not yet present.

Preferably, the spark plug alone is operated at low engine temperatures of the internal combustion engine, preferably at engine temperatures of no more than 323 K, in particular no more than 303 K, especially preferably no more than 293 K. For example, a temperature of a coolant of the internal combustion engine can be determined as the engine temperature in order to obtain a particularly simple determination. Alternatively, a combined operation of spark plug and prechamber spark plug can also be carried out simultaneously at such low temperatures.

Preferably, the spark plug and the prechamber spark plug are operated at different, preferably independent, ignition timing points, in particular within a single operating cycle of the internal combustion engine. For example, the spark plug can be operated, preferably at high load, exclusively during an exhaust stroke, preferably using only the prechamber spark plug to ignite the fuel-air mixture. Doing so enables optimal, complete and efficient combustion depending on the operating state of the internal combustion engine.

Particularly preferably, the internal combustion engine is operated at a lambda number of at least 1, at least within a partial operating range. Particularly preferably, the prechamber spark plug is operated within this partial operating range. Preferably, the spark plug can be inactive within this partial operating range. Alternatively, however, a combined operation of spark plug and prechamber spark plug can also take place. In a further alternative embodiment, within this partial operating range, operation of the spark plug alone can occur, i.e., while the prechamber spark plug is inactive. Particularly preferably, the lambda number within at least one partial operating range of the internal combustion engine is at least 1.05. In other words, in this case the internal combustion engine is operated within the partial operating range with a lean fuel-air mixture. Preferably, the prechamber spark plug and/or spark plug is operated during lean operation. Particularly fuel-efficient operation in which reliable ignition of the fuel-air mixture with a low knocking tendency is thereby made possible in particular by the prechamber spark plug.

BRIEF DESCRIPTION OF THE DRAWINGS

Exemplary embodiments of the disclosure are described in detail hereinafter with reference to the accompanying drawings. The drawings show.

DETAILED DESCRIPTION

Figure 1:
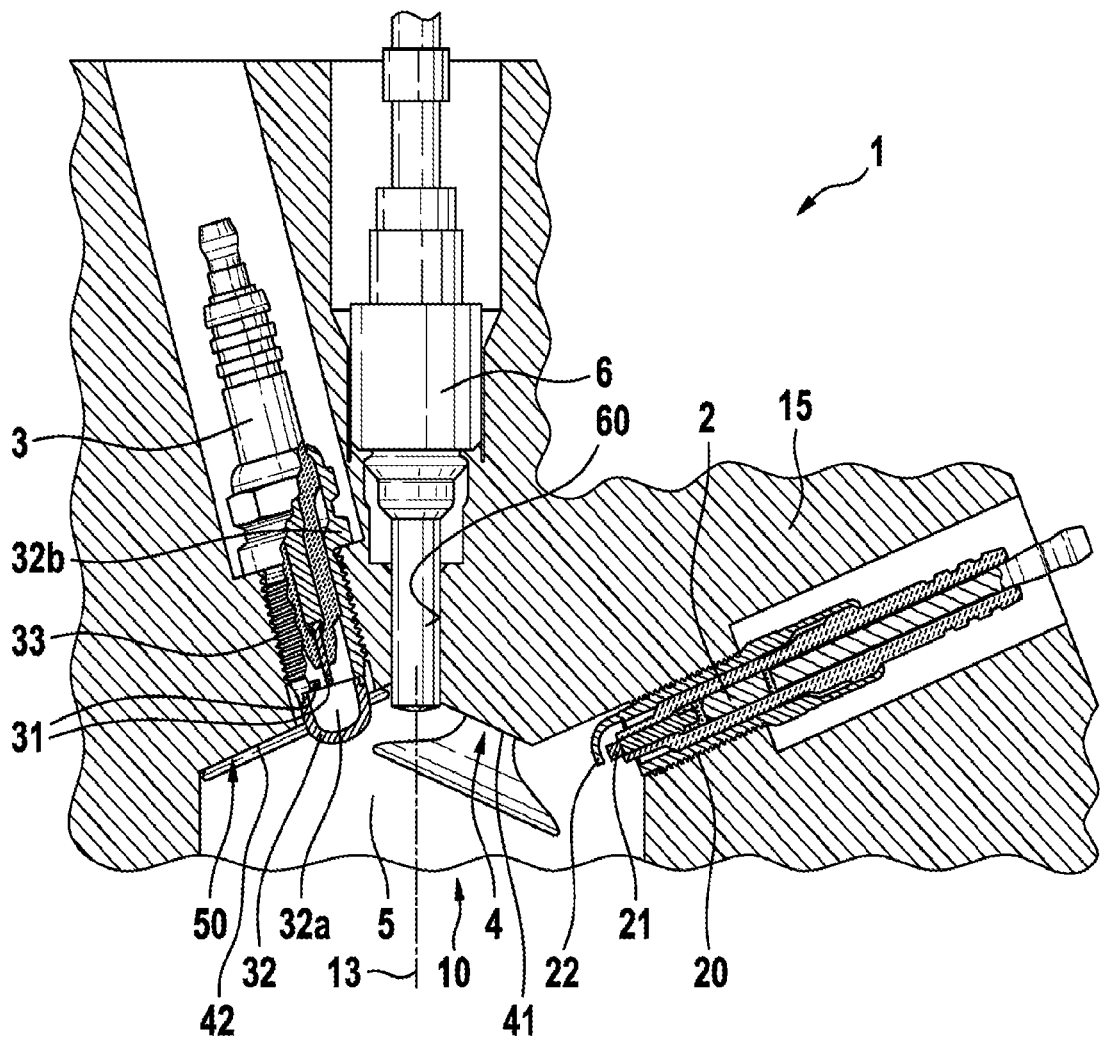
FIG. 1 a sectional view of an internal combustion engine according to a first exemplary embodiment of the disclosure, FIGS. 2a-c simplified schematic detail views of various configurations of the internal combustion engine in FIG. 1, FIGS. 3a-d simplified schematic detail views of further configurations of the internal combustion engine in FIG. 1, FIG. 4 a sectional view of an internal combustion engine according to a second exemplary embodiment of the disclosure, and FIGS. 5a-d simplified schematic detail views of various preferred configurations of the internal combustion engine in FIG. 4.

FIG. 1 shows a simplified sectional view of an internal combustion engine 1 according to a first exemplary embodiment of the disclosure. The internal combustion engine 1 comprises several cylinders 10, with only one of the cylinders 10 being shown in FIG. 1. The cylinder 10 comprises a combustion chamber 5 which is delimited at its upper end by a combustion chamber roof 50. The combustion chamber roof 50 is formed by a cylinder head 15 of the internal combustion engine 1. The combustion chamber roof 50 is preferably conical or tapered towards the top, a roof apex forming in particular in the center point 54 (see FIG. 2) of the combustion chamber roof 50. The center point 54 lies centrally, in particular on a central axis 13, of the preferably circular cylinder 10.

For each cylinder 10, the internal combustion engine 1 comprises two charge-exchange ports 4. A first charge-exchange port 4 is an inlet port 41, through which fresh air from an intake manifold 70 (see FIG. 4) can flow into the combustion chamber 5, and a second charge-exchange port 4 is an outlet port 42, through which exhaust gases can flow out of the combustion chamber 5 into an exhaust pipe 18 (see FIG. 4) after combustion.

The internal combustion engine 1 further comprises a combustion chamber fuel injector 6 per cylinder 10, which is arranged to inject liquid or gaseous fuel directly into the combustion chamber 5. The combustion chamber fuel injector projects slightly into the combustion chamber 5. Alternatively, the combustion chamber fuel injector 6 can be retracted within an injector bore 60 in which it is arranged.

In addition, the internal combustion engine comprises one spark plug 2 and one prechamber spark plug 3 per cylinder 10.

The spark plug 2 is an ordinary spark plug which is configured to ignite a fuel-air mixture located in the combustion chamber 5 by means of an electric spark. For this purpose, the spark plug 2 can feature a center electrode 21, and a lateral, hook-shaped front electrode 22, which in particular forms the earth electrode. The ignition spark can be generated between the two electrodes 21, 22. The spark plug 2 can be arranged in a bore 20 within the cylinder head 15 as shown in FIG. 1, the bore 20 opening into the combustion chamber 5. Alternatively, the spark plug 2 can also protrude into the combustion chamber 5.

The prechamber spark plug 3 comprises a plug cap 32 arranged at an axial end of a housing 32b of the prechamber spark plug 3. The plug cap 32 thereby forms a prechamber 32a within the prechamber spark plug 3, the prechamber 32a communicating with the combustion chamber 5 via (not shown) passage ports which penetrate the plug cap 32. By means of electrodes 31, a fuel-air mixture can be ignited inside the prechamber 32a so that several, preferably four, flare jets (see FIG. 2, FIG. 3, or FIG. 5; shown schematically as lobe-shaped jets emanating from the prechamber spark plug 3), in particular in the form of flames, spread through the passage ports into the combustion chamber 5 in order to ignite the fuel-air mixture there. The prechamber spark plug 3 is screwed into a bore 33 in the cylinder head 15. The prechamber spark plug 3 is screwed in so that the plug cap 32 projects into the combustion chamber 5.

The prechamber spark plug 3 is optimized for operation of the internal combustion engine 1 under high load and while the internal combustion engine 1 is operated using a stoichiometric or lean fuel-air mixture. Due to the special ignition method of the prechamber spark plug 3, the fuel-air mixture can be ignited reliably and with a low knocking tendency of the internal combustion engine 1. This can enable particularly fuel-efficient operation of the internal combustion engine 1 without the risk of damage due to knocking.

The spark plug 2 is operated in particular after a cold start, during a catalytic converter heating operation and at low loads in order to enable reliable ignition of the fuel-air mixture combustion chamber 5 even in these operating ranges.

Figure 2:
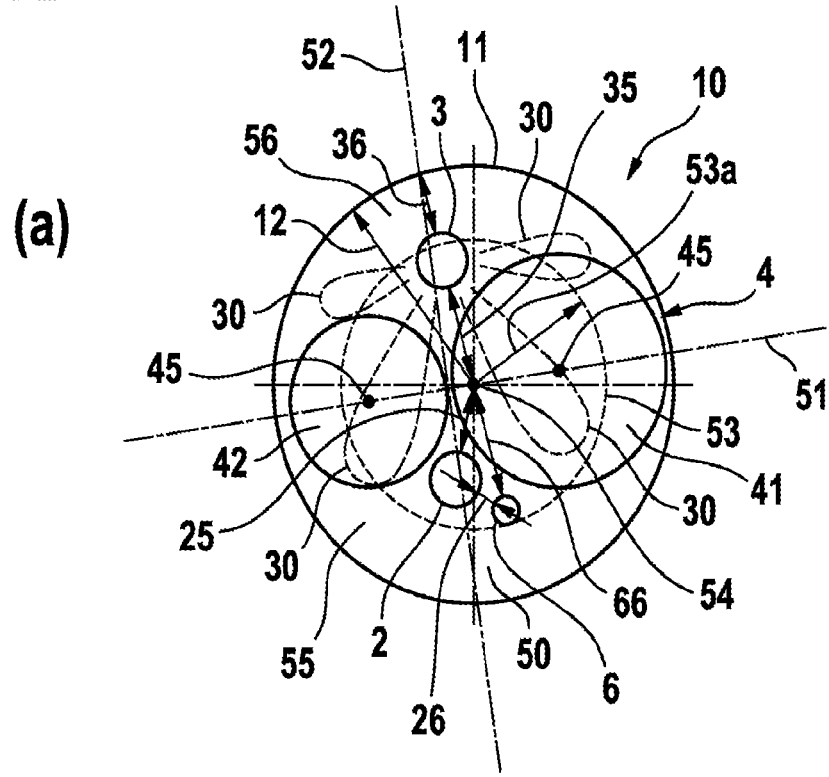
Figure 2:
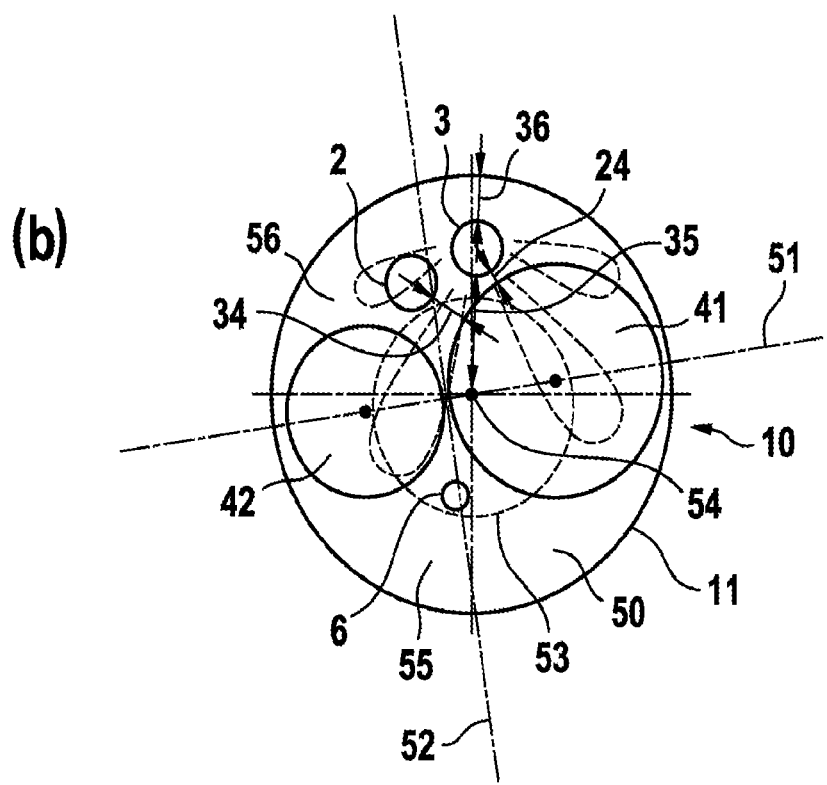
Figure 2:
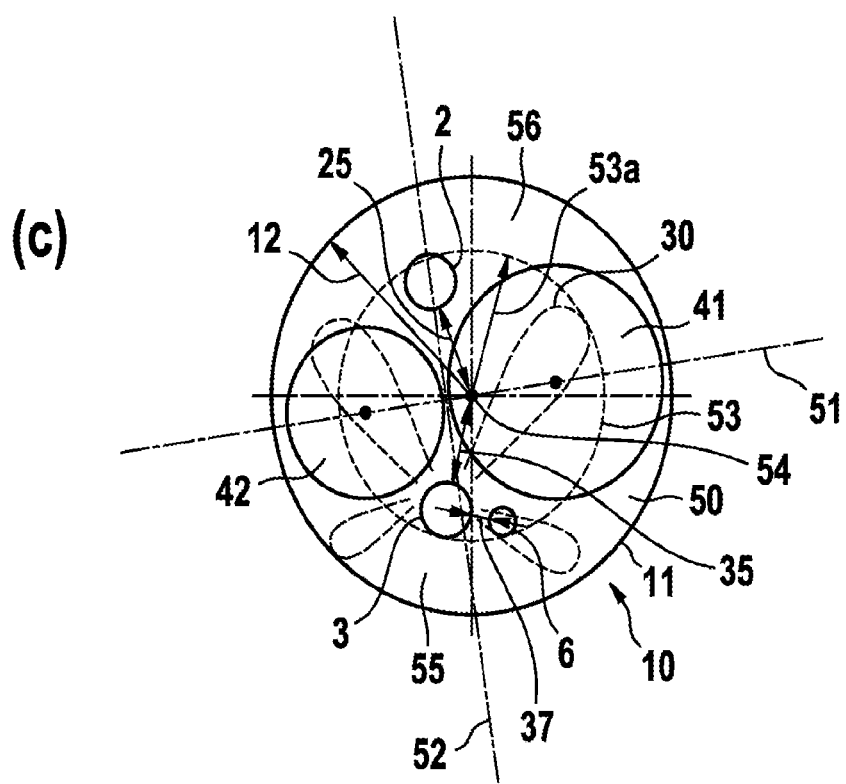
Figure 3:
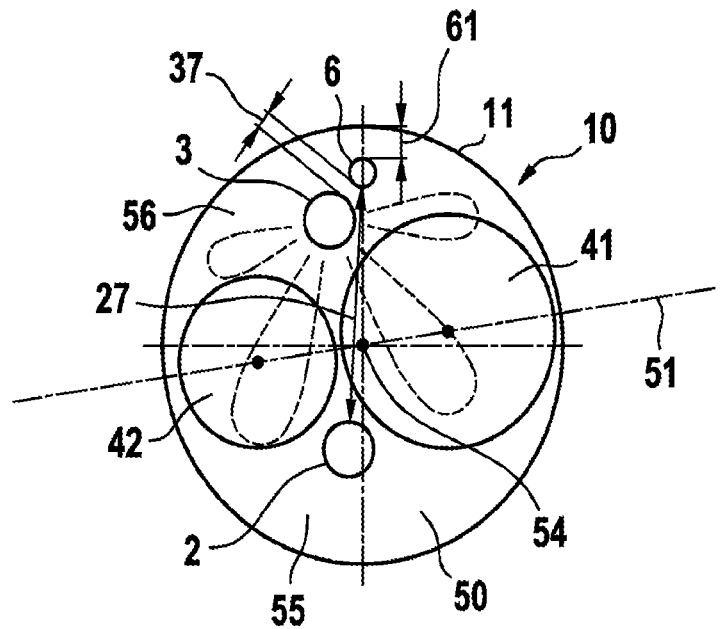
Figure 3:
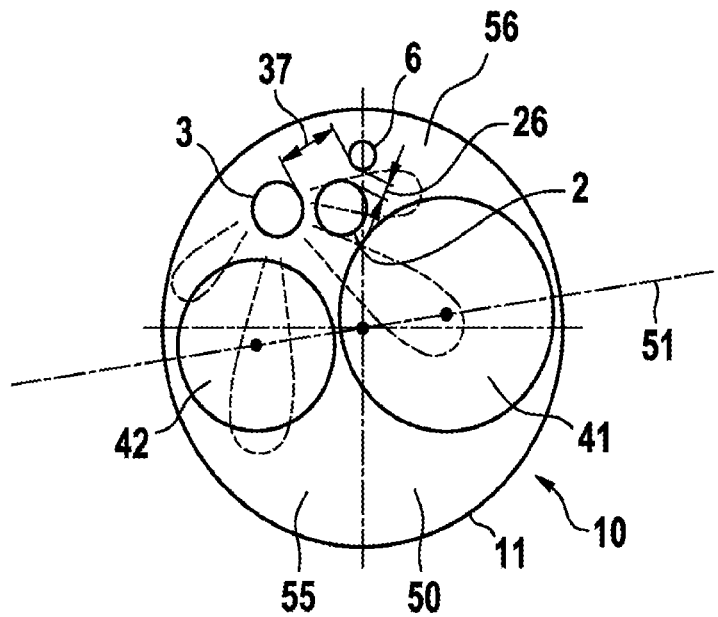
Figure 3:
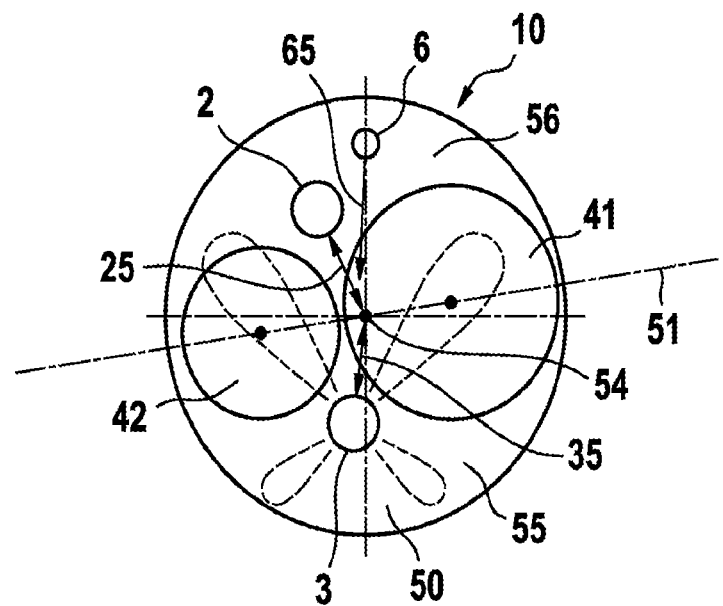
Figure 3:
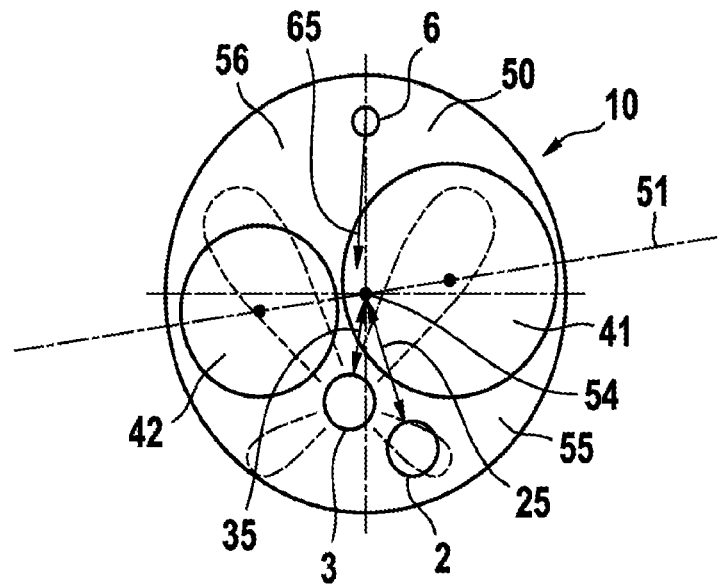

In FIGS. 2 and 3, several preferred variants for arrangements of the combustion chamber fuel injector 6, the spark plug 2, and the prechamber spark plug 3 on the combustion chamber roof 50 are shown schematically in simplified form, which are described hereinafter. A top view of the combustion chamber roof 50 is shown along a piston direction, along which a piston (not shown) of the internal combustion engine 1 can move. The piston direction is parallel to the central axis 12 of the cylinder 10.

As can be seen in FIGS. 2 and 3, the inlet port 41 features a larger cross-section than the outlet port 42. Alternatively, the inlet port 41 and the outlet port 42 could feature an identical cross-section, or further alternatively, the outlet port 42 could feature a larger cross-section than the inlet port 41. The inlet port 41 and the outlet port 42 are each circular in shape, and are inscribed in the combustion chamber roof 50 such that a maximum total cross-section is provided for the charge exchange. Alternatively, the charge-exchange ports 4 could also be smaller.

In order to simplify the description of the position of the elements on the combustion chamber roof 50, two sectional planes 51, 52 are drawn perpendicular to each other and parallel to the piston direction. A first sectional plane 51 is arranged to divide the combustion chamber roof 50 into two roof sections 55, 56, the first sectional plane 51 lying on respective center points 45 of the charge-exchange ports 4. In particular, the first sectional plane 51 can also be considered as the symmetry plane of the combustion chamber roof 50. A second sectional plane 52 is arranged such that one of the two charge-exchange ports 4 is located on one side of the second sectional plane 52 in each case. In particular, the second sectional plane 52 is arranged tangentially to the two charge-exchange ports 4 and between them.

FIG. 2 shows variants of arrangements of the components in the combustion chamber roof 50 with a central position of the combustion chamber fuel injector 6. The central location is considered to be within a center point area 53, which is circularly formed around the center point 54 of the combustion chamber roof 50 with a radius 53a of 50% of a cylinder radius 12. Due to the central position of the combustion chamber fuel injector 6, a particularly even distribution of the injected fuel spray in the combustion chamber 50 can be achieved.

In all of the variants shown in FIG. 2, the combustion chamber fuel injector 6 is located in a first roof area 55.

FIG. 2(a) shows an arrangement with the spark plug 2 in the first roof area 55 and with the prechamber spark plug 3 in the second roof area 56. As a result, a distance 26 between spark plug 2 and combustion chamber fuel injector 6 is kept to a minimum. A distance 66 between the combustion chamber fuel injector 6 and the center point 54 of the combustion chamber roof 50 is greater than a distance 25 between the spark plug 2 and the center point 54. As a result, the fuel-air mixture can be ignited as centrally as possible by means of the spark plug 2, whereby a particularly uniform ignition can be achieved in the combustion chamber 5. The prechamber spark plug 3 is located at a distance 35 from the center point 54, which is greater than the distance 25 of the spark plug 2 from the center point 54. Moreover, the prechamber spark plug 3 is arranged close to a sidewall 11 of the cylinder 10, in which case a minimum distance 37 between the sidewall 11 and the prechamber spark plug 3 is smaller than the distance 35 to the center point 54. The prechamber spark plug 3 is designed and arranged such that flare jets 30 generated during its operation are directed essentially in the direction of the first roof area 55. Due to the proximity of the combustion chamber fuel injector 6 and the spark plug 2, the arrangement in FIG. 2(a) offers a particularly efficient mode of operation of the internal combustion engine 1 when operating the spark plug 2, since the spray produced can be ignited in a particularly targeted and reliable manner by the spark plug 2.

FIG. 2(b) shows an arrangement in which, in addition to the prechamber spark plug 3, the spark plug 2 is also arranged in the second roof area 56. In this case, a distance 34 between the spark plug 2 and the inlet port 41 is greater than a distance 24 between the prechamber spark plug 3 and the inlet port 41. In this configuration, there is a particularly large amount of space provided in the first roof area 55 for an optimal arrangement of the combustion chamber fuel injector 6.

FIG. 2(c) shows an arrangement similar to FIG. 2(a) in which the spark plug 2 and the prechamber spark plug 3 are arranged in an interchanged manner. In other words, the prechamber spark plug 3 is arranged at a minimum distance 36 from the combustion chamber fuel injector 6. Doing so results in the advantage that better scavenging and mixture supply to the prechamber spark plug 3 can be made possible by the immediate proximity to the combustion chamber fuel injector 6. In this case, it is particularly advantageous if the injection direction of the combustion chamber fuel injector is directly aligned with the prechamber spark plug 3. In addition, the prechamber spark plug 3 is arranged as centrally as possible with a minimum distance 35 from the center point 54 of the combustion chamber roof 50, which enables the combustion chamber 5 to be penetrated as uniformly as possible by the flare jets 30 and thus a particularly uniform ignition.

FIG. 3 shows variants in which the combustion chamber fuel injector 6 is located in the second roof area 56. The combustion chamber fuel injector 6 is in this case arranged laterally, at a small distance 61 from the sidewall 11. Due to the lateral arrangement of the combustion chamber fuel injector 6, more space is provided for the spark plug 2 and the prechamber spark plug 3 in the central area of the combustion chamber roof 50 near the center point 54, so these can both be arranged as centrally as possible for improved uniform ignition.

FIG. 3(a) shows a variant in which the prechamber spark plug 3 is arranged at a particularly small distance 36 from the combustion chamber fuel injector 6. The spark plug 2 is arranged in the opposite first roof area 55 and at a distance 27 from the combustion chamber fuel injector 6, which is significantly greater than the distance 36.

FIG. 3(b) shows a variant in which the spark plug 2 is also arranged in the second roof area. Doing so enables the spark plug 2 and also the prechamber spark plug 3 to be arranged particularly close to the injector, which enables reliable, robust ignition during operation of both the spark plug 2 and the prechamber spark plug 3. This drawing shows an arrangement with a distance 26 from the spark plug 2, which is smaller than the distance 36 from the prechamber spark plug 3, in each case to the combustion chamber fuel injector 6. Alternatively, the spark plug 2 and the prechamber spark plug 3 can preferably also be arranged interchangeably.

FIG. 3(c) shows a variant similar to FIG. 3(a), with the spark plug 2 and the prechamber spark plug 3 being arranged interchangeably. This means that spark plug 2 is close to the injector and prechamber spark plug 3 is far from the injector. A distance 35 of the prechamber spark plug 3 to the center point 54 of the combustion chamber roof 50 is smaller than a distance 25 of the spark plug 2 to the center point 54.

FIG. 3(d) shows a variant in which the spark plug 2 and the prechamber spark plug 3 are arranged in the first roof area 55 and thus remote from the injector. The prechamber spark plug 3 is arranged at a distance 35 from the center point 54 of the combustion chamber roof 50, which is smaller than the distance between the spark plug 2 and the center point 54.

Figure 4:
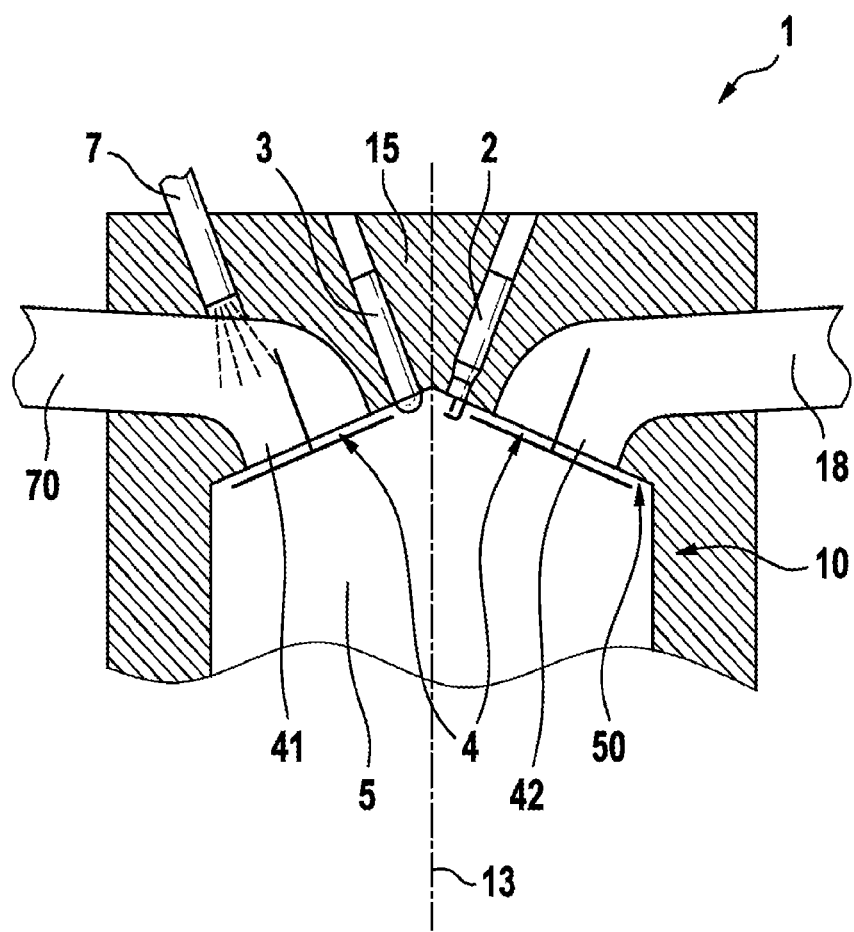

FIG. 4 shows a sectional view of an internal combustion engine 1 according to a second exemplary embodiment of the disclosure. The second exemplary embodiment corresponds essentially to the first exemplary embodiment in FIGS. 1 to 3, with the difference that instead of a combustion chamber fuel injector 6 arranged in the combustion chamber roof 50 and injecting directly, an intake manifold fuel injector 7 is provided. The intake manifold fuel injector 7 is located in the cylinder head 15 and on an intake manifold 70 and is arranged to inject liquid or gaseous fuel into the intake manifold 70. The intake manifold 7 opens into the combustion chamber 5 at the inlet port 41 and thus directs the fuel-air mixture into the combustion chamber 5.

Figure 5:
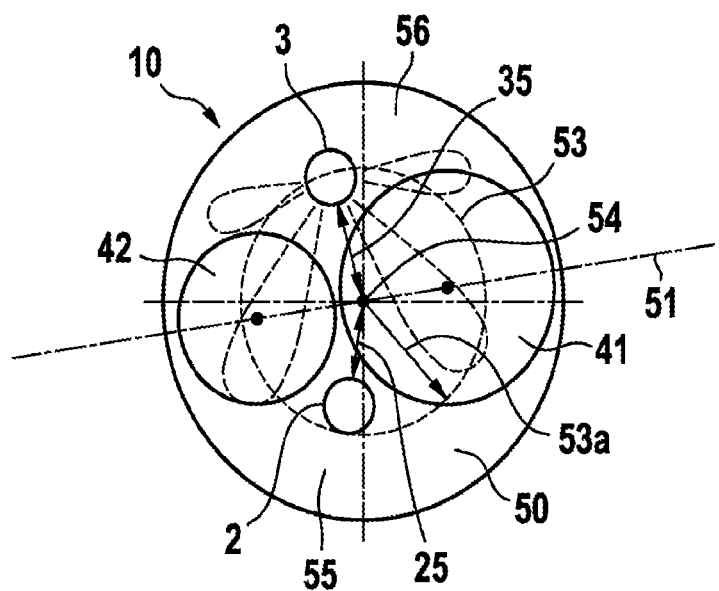
Figure 5:
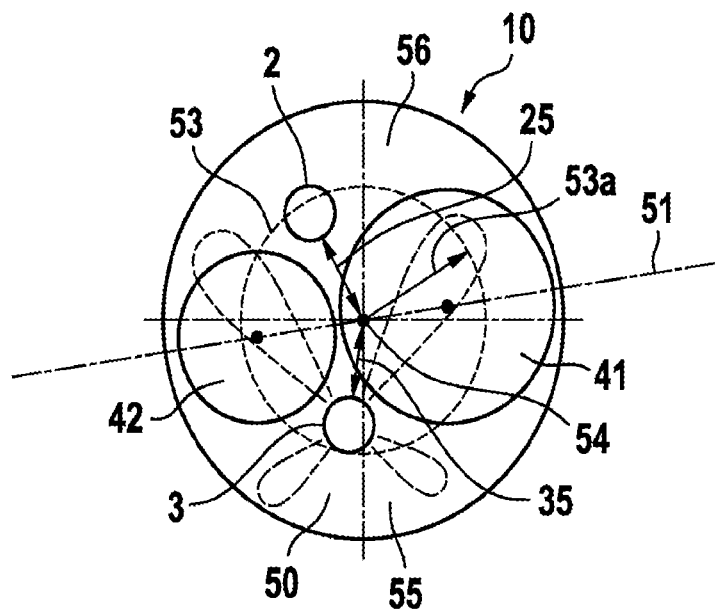
Figure 5:
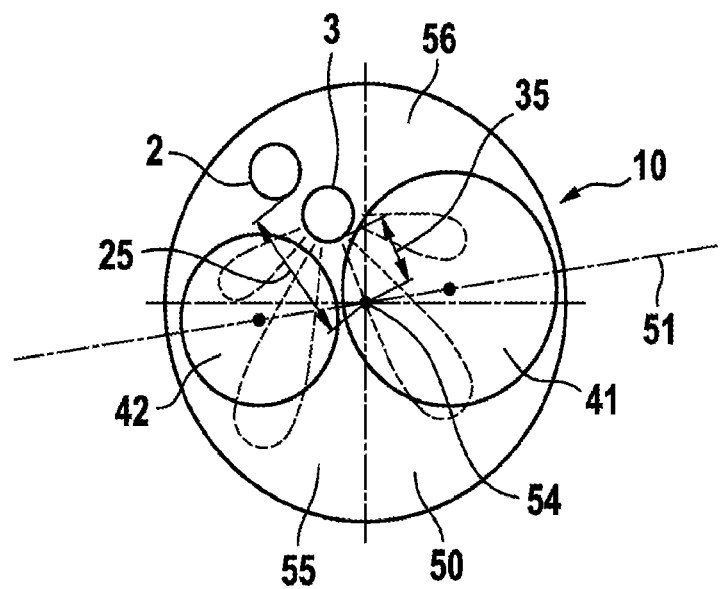
Figure 5:
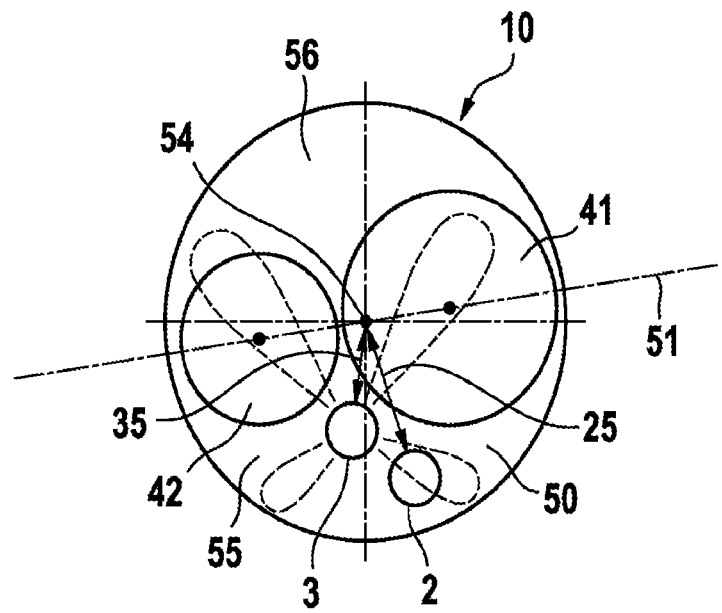

FIG. 5 shows variants of the arrangements of spark plug 2 and prechamber spark plug 3 on the combustion chamber roof 50 of the internal combustion engine 1 of the second exemplary embodiment in FIG. 4. Since in the second exemplary embodiment no fuel injector is arranged on the combustion chamber roof 50, there is advantageously more space provided for the spark plug 2 and the prechamber spark plug 3, so that these can both be arranged comparatively centrally (as in particular in the variants in FIGS. 5(a) and (b)) and particularly flexibly for optimum uniform ignition.

FIG. 5(a) shows a variant in which the spark plug 2 is arranged in the first roof area 55 and the prechamber spark plug 3 in the second roof area 56. The distance 25 of the spark plug 2 is smaller than the distance 35 of the prechamber spark plug 3, in each case to the center point 54 of the combustion chamber roof 50. Both spark plug 2 and prechamber spark plug 3 can be arranged particularly close to the inlet port 41, whereby optimum ignition of the fuel-air mixture flowing into combustion chamber 5 can be achieved in each case.

The variant in FIG. 5(b) shows a reversed arrangement of spark plug 2 and prechamber spark plug 3, i.e. such that the prechamber spark plug 3 is arranged closer to the center point 54 of the combustion chamber roof 50.

FIG. 5(c) shows a variant in which spark plug 2 and prechamber spark plug 3 are arranged in the second roof area 56. The distance 35 between the prechamber spark plug 3 and the center point 54 is smaller than the distance 25 between the spark plug 2 and the center point 54.

FIG. 5(d) shows a variant with spark plug 2 and prechamber spark plug 3 in the first roof area, in which case the distances 25, 35 from the center point 54 respectively are proportionally formed as in FIG. 5(c).

It should be noted that all distances referred to are minimum distances. In other words, a "distance between the spark plug and the center point of the combustion chamber roof" is, e.g., considered to be the minimum distance between an outer circumference of the spark plug, in particular substantially in a plane of the combustion chamber roof, and the center point of the combustion chamber roof.

The invention claimed is:

1. An internal combustion engine comprising:
    at least one cylinder;
    only two charge-exchange ports per the at least one cylinder, wherein
        a first charge-exchange port is an inlet port, and
        a second charge-exchange port is an outlet port; and
    one spark plug and one prechamber spark plug per the at least one cylinder,
    wherein
    the spark plug and/or the prechamber spark plug is arranged on a combustion chamber roof of a combustion chamber of the at least one cylinder, and
    the prechamber spark plug is arranged closer to a sidewall of the at least one cylinder than the spark plug or the spark plug is arranged closer to the center point of the combustion chamber roof than the prechamber spark plug.

2. The internal combustion engine according to claim 1, wherein:
    the first and second charge-exchange ports are arranged in the combustion chamber roof; and
    the combustion chamber roof is divided by a first sectional plane into two roof areas such that the first sectional plane lies on center points of the first and second charge-exchange ports, and
    the spark plug and the prechamber spark plug are arranged within the same roof area of the two roof areas, or the spark plug and the prechamber spark plug are arranged within different roof areas of the two roof areas.

3. The internal combustion engine according to claim 2, wherein:
    the combustion chamber roof is divided by a second sectional plane perpendicular to the first sectional plane such that the inlet port and the outlet port lie on different sides of the second sectional plane; and
    the spark plug and/or the prechamber spark plug is arranged on the second sectional plane.

4. The internal combustion engine according to claim 1, wherein the prechamber spark plug is arranged closer to the inlet port or closer to the outlet port than the spark plug.

5. The internal combustion engine according to claim 1, wherein the spark plug and/or the prechamber spark plug is arranged within a center point area of the combustion chamber roof with a predefined radius no more than 60% of a cylinder radius of the at least one cylinder around a center point of the combustion chamber roof.

6. The internal combustion engine according to claim 1, further comprising a combustion chamber fuel injector configured to directly inject fuel into the combustion chamber.

7. The internal combustion engine according to claim 6, wherein the combustion chamber fuel injector is arranged on the combustion chamber roof.

8. The internal combustion engine according to claim 7, wherein:
    the charge-exchange ports are arranged in the combustion chamber roof;
    the combustion chamber roof is divided into two roof areas by a first sectional plane such that the sectional plane lies on center points of the first and second charge-exchange ports; and
    the combustion chamber fuel injector and the spark plug and/or the combustion chamber fuel injector and the prechamber spark plug are arranged within the same roof area.

9. The internal combustion engine according to claim 8, wherein:
    the combustion chamber roof is divided by a second sectional plane perpendicular to the first sectional plane, such that the inlet port and the outlet port lie on different sides of the second sectional plane; and
    the combustion chamber fuel injector is arranged on the second sectional plane.

10. The internal combustion engine according to claim 7, wherein the combustion chamber fuel injector is arranged within a center point area with a predefined maximum radius of 50% of the cylinder radius, around a center point of the combustion chamber roof.

11. The internal combustion engine according to claim 6, wherein:
    the prechamber spark plug is arranged closer to the combustion chamber fuel injector than the spark plug; or
    the spark plug is arranged closer to the combustion chamber fuel injector than the prechamber spark plug.

12. The internal combustion engine according to claim 6, wherein an injection direction of the combustion chamber fuel injector is oriented in a direction of the spark plug or the prechamber spark plug.

13. The internal combustion engine according to claim 1, further comprising an intake manifold fuel injector configured to inject fuel into an intake manifold of the internal combustion engine.

14. A method for operating an internal combustion engine having at least one cylinder, wherein the internal combustion engine comprises only two charge-exchange ports and a spark plug and a prechamber spark plug per at least one cylinder, comprising:
    operating the spark plug and/or the prechamber spark plug to ignite a fuel/air mixture within a combustion chamber of the at least one cylinder,
    wherein
    the spark plug and/or the prechamber spark plug is arranged on a combustion chamber roof of a combustion chamber of the at least one cylinder, and
    the prechamber spark plug is arranged closer to a sidewall of the at least one cylinder than the spark plug or the spark plug is arranged closer to the center point of the combustion chamber roof than the prechamber spark plug.

15. The method according to claim 14, wherein:
- the internal combustion engine is operated at a torque of at least 80% of a nominal torque of the internal combustion engine; and
- during the operation of the internal combustion engine at the torque of at least 80%, of the nominal torque of the internal combustion engine, the prechamber spark plug is operated alone.

16. The method according to claim 14, wherein:
- the internal combustion engine is operated at a torque of less than 20% of a nominal torque of the internal combustion engine; and
- during the operation of the internal combustion engine under low load, in particular at the torque of less than 20%, of the nominal torque of the internal combustion engine, the spark plug is operated alone.

17. The method according to claim 14, wherein the spark plug is operated during a catalyst heating phase, after a cold start of the internal combustion engine, and/or at low engine temperatures.

18. The method according to claim 14, wherein the spark plug and the prechamber spark plug are operated at different, mutually independent, ignition times.

19. The method according to claim 14, wherein the internal combustion engine is operated at a lambda number of at least 1, at least within a partial operating range, during operation of the spark plug and/or prechamber spark plug.

* * * * *